United States Patent
Ahn et al.

(10) Patent No.: US 10,764,035 B2
(45) Date of Patent: Sep. 1, 2020

(54) CONTROL METHODS OF DECRYPTION KEY STORAGE SERVER, BIOMETRIC INFORMATION STORAGE SERVER, AND MATCHING SERVER IN AUTHENTICATION SYSTEM

(71) Applicant: SUPREMA ID INC., Seongnam-si, Gyeonggi-do (KR)

(72) Inventors: Won Seok Ahn, Yongin-si (KR); Jin Wook Yi, Yongin-si (KR); Bo Gun Park, Seoul (KR); Jae Won Lee, Seongnam-si (KR)

(73) Assignee: SUPREMA ID INC., Seongnam-si (KR)

( * ) Notice: Subject to any disclaimer, the term of this patent is extended or adjusted under 35 U.S.C. 154(b) by 168 days.

(21) Appl. No.: 15/457,543

(22) Filed: Mar. 13, 2017

(65) Prior Publication Data
US 2017/0264429 A1     Sep. 14, 2017

(30) Foreign Application Priority Data

Mar. 14, 2016   (KR) .................. 10-2016-0030403

(51) Int. Cl.
*H04L 9/08* (2006.01)
*H04L 29/06* (2006.01)
(Continued)

(52) U.S. Cl.
CPC ............ *H04L 9/08* (2013.01); *G06F 21/00* (2013.01); *G06F 21/32* (2013.01); *H04L 9/0894* (2013.01);
(Continued)

(58) Field of Classification Search
USPC ................................ 713/168, 178
See application file for complete search history.

(56) References Cited

U.S. PATENT DOCUMENTS 10,043,229 B2 *   8/2018   Hanna ............. H04L 63/0861
2005/0076220 A1 *  4/2005   Zhang ............. H04L 63/126
                                                        713/176
(Continued)

FOREIGN PATENT DOCUMENTS

| JP | 2007-226519 A | 9/2007 |
| JP | 2007-293469 A | 11/2007 |
| KR | 10-2015-0107669 A | 12/2015 |

*Primary Examiner* — Jahangir Kabir
(74) *Attorney, Agent, or Firm* — Maschoff Brennan

(57) ABSTRACT

Provided are control methods of a decryption key storage server, a biometric information storage server, and a matching server in an authentication system. The control method of a decryption key storage server in an authentication system includes: acquiring an identifier of a target client and a encrypted biometric information for authentication; acquiring biometric information for registration corresponding to the identifier to be matched among pieces of the biometric information for registration having been encrypted by the at least one client transmitting the biometric information for registration; extracting a decryption key corresponding to the identifier from the at least one decryption key; decrypting the encrypted biometric information for authentication and the biometric information for registration corresponding to the identifier using the decryption key corresponding to the identifier; and determining whether or not the decrypted biometric information for authentication and the decrypted biometric information for registration corresponding to the identifier match.

17 Claims, 9 Drawing Sheets

(51) Int. Cl.
*G06F 21/32* (2013.01)
*G06F 21/00* (2013.01)
*H04L 9/32* (2006.01)

(52) U.S. Cl.
CPC ............ *H04L 9/3231* (2013.01); *H04L 63/06* (2013.01); *H04L 63/0861* (2013.01); *H04L 67/42* (2013.01); *H04L 63/0428* (2013.01)

(56) References Cited

U.S. PATENT DOCUMENTS

| | | | |
|---|---|---|---|
| 2005/0195975 A1* | 9/2005 | Kawakita | H04L 9/0825 380/30 |
| 2006/0245619 A1* | 11/2006 | Sathath | G06F 21/31 382/115 |
| 2008/0113785 A1* | 5/2008 | Alderucci | G06F 21/32 463/29 |
| 2009/0034725 A1* | 2/2009 | Davies, Sr. | H04L 63/08 380/255 |
| 2009/0164797 A1* | 6/2009 | Kramer | G06F 21/32 713/186 |
| 2017/0134375 A1* | 5/2017 | Wagner | H04L 63/0861 |

* cited by examiner

CONTROL METHODS OF DECRYPTION KEY STORAGE SERVER, BIOMETRIC INFORMATION STORAGE SERVER, AND MATCHING SERVER IN AUTHENTICATION SYSTEM

CROSS-REFERENCE TO RELATED APPLICATION

This application claims priority to and the benefit of Korean Patent Application No. 10-2016-0030403, filed on Mar. 14, 2016, the disclosure of which is incorporated herein by reference in its entirety.

BACKGROUND

1. Field of the Invention

The present invention relates to control methods of a decryption key storage server, a biometric information storage server, and a matching server in an authentication system.

2. Discussion of Related Art

Technology for using various kinds of signals or data which can be extracted from a living body in a variety of systems is under development. In particular, a biometric authentication technology for building a security system using biometric information is attracting attention. For example, according to the biometric authentication technology, a signal or information associated with a user's body is extracted from the user and compared with previously stored information to verify and authenticate the user.

Such a biometric authentication technology may be implemented in a network. For example, a biometric information recognizer that recognizes biometric information may authenticate a user through communication with a server. Specifically, a biometric information recognizer encrypts biometric information acquired from a user and then transmits the encrypted biometric information to a server which stores previously registered biometric information, and the server decrypts the encrypted biometric information acquired from the biometric information recognizer and then compares the decrypted biometric information with the previously registered biometric information to authenticate the user. Here, according to a related art, a decryption key for decrypting the biometric information and the previously registered biometric information are stored in the server together. Therefore, malicious external hacking attempts may be concentrated on a single server, and biometric information of users may be leaked when the server is hacked.

Accordingly, continuous efforts have recently been made to more safely implement the biometric authentication technology in a network.

SUMMARY OF THE INVENTION

The present invention is directed to providing an apparatus and method for more safely storing biometric information of users and decrypting biometric information to authenticate a user.

According to an aspect of the present invention, there is provided a control method of a decryption key storage server in an authentication system including a biometric information storage server storing biometric information for registration acquired from each of at least one client, a target client included in the at least one client, and acquiring biometric information for authentication of a user and encrypting the biometric information for authentication using a unique encryption key, and the decryption key storage server storing at least one decryption key, the control method including: acquiring an identifier of the target client and the encrypted biometric information for authentication; acquiring biometric information for registration corresponding to the identifier to be matched among pieces of the biometric information for registration having been encrypted by each of the at least one client transmitting the biometric information for registration; extracting a decryption key corresponding to the identifier from the at least one decryption key; decrypting the encrypted biometric information for authentication and the biometric information for registration corresponding to the identifier using the decryption key corresponding to the identifier; determining whether or not the decrypted biometric information for authentication and the decrypted biometric information for registration corresponding to the identifier match; and providing a matching result to the biometric information storage server or the target client, wherein the at least one decryption key is stored in the decryption key storage server that is separate from the biometric information storage server storing the biometric information for registration so that security of the authentication system is improved.

According to another aspect of the present invention, there is provided a control method of a biometric information storage server in an authentication system including the biometric information storage server storing biometric information for registration acquired from each of at least one client, a target client included in the at least one client, and acquiring biometric information for authentication of a user and encrypting the biometric information for authentication using a unique encryption key, and a decryption key storage server storing at least one decryption key, the control method including: acquiring an identifier of the target client and the encrypted biometric information for authentication according to a user authentication request of the target client; extracting biometric information for registration corresponding to the identifier of the target client among pieces of the biometric information for registration having been encrypted by the at least one client transmitting the biometric information for registration; acquiring a matching result of the biometric information for registration corresponding to the identifier and the biometric information for authentication decrypted based on at least a portion of the at least one decryption key; and providing the matching result or information according to the matching result to the target client, wherein the biometric information for registration is stored in the biometric information storage server that is separate from the decryption key storage server storing the at least one decryption key so that security of the authentication system is improved.

According to another aspect of the present invention, there is provided a control method of a matching server in an authentication system including a biometric information storage server storing biometric information for registration acquired from each of at least one client, a target client included in the at least one client, and acquiring biometric information for authentication of a user and encrypting the biometric information for authentication using a unique encryption key, at least one sub-matching server decrypting the biometric information for authentication using a decryption key, and the matching server matching a piece of the biometric information for registration to the biometric information for authentication, the control method including: acquiring the encrypted biometric information for authentication; acquiring biometric information for registration corresponding to an identifier of the target client among pieces of the biometric information for registration having been encrypted by each of the at least one client transmitting the biometric information for registration; providing the encrypted biometric information for authentication and the biometric information for registration corresponding to the identifier to the at least one sub-matching server to decrypt the encrypted biometric information for authentication and the biometric information for registration corresponding to the identifier; acquiring the decrypted biometric information for authentication and the decrypted biometric information for registration corresponding to the identifier; determining whether or not the decrypted biometric information for authentication and the decrypted biometric information for registration corresponding to the identifier match; and providing a matching result to the biometric information storage server or the target client, wherein the decryption key is stored in at least one of the matching server or the at least one sub-matching server that is separate from the biometric information storage server storing the biometric information for registration so that security of the authentication system is improved.

Solutions to the problems of the present invention are not limited to the solutions described above, and other solutions that are not mentioned above may be clearly understood by those of ordinary skill in the art to which the present invention pertains from the following descriptions and the appended drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
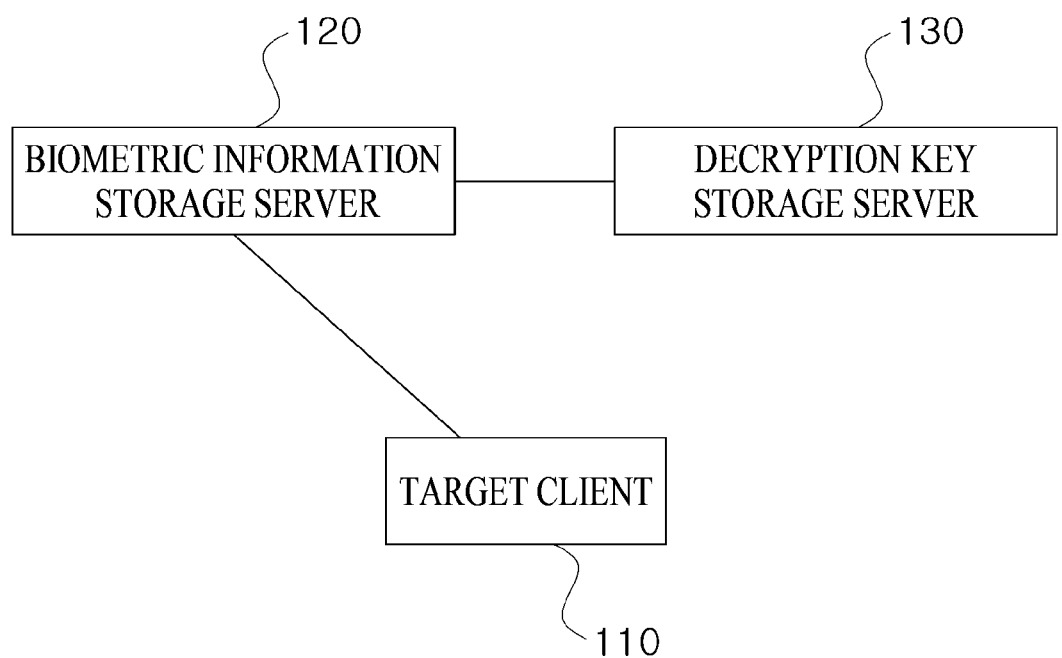
FIG. 1 is a diagram showing an authentication system according to an exemplary embodiment.

Hereinafter, exemplary embodiments will be described with reference to the appended drawings. However, the present invention is not limited to the embodiments. Throughout the drawings, like reference numerals denote like elements.

In the drawings, a thickness of layers and regions are exaggerated for clarity. It should be understood that when an element or layer is referred to as being "on" another element or layer, the element or layer can be directly on the other element or layer, or an intervening element or layer can be interposed between the element and the other element. Like reference numerals designate like elements throughout the specification.

Detailed descriptions of known functions or configurations are omitted when it is determined that such detailed descriptions may unnecessarily obscure the subject matter of the present invention. Numerals (e.g., first, second, etc.) used herein for description are merely identification signs for distinguishing one element from another element.

An electronic device associated with the present invention will be described in detail below with reference to drawings. The suffixes "module" and "unit" of components used in the following description are only given for convenience of description. Therefore, the suffixes can be used interchangeably and do not have any distinguishable meanings or functions.

<Authentication System Using Single Stage Decryption>

FIG. 1 is a diagram showing an authentication system according to an exemplary embodiment.

Referring to FIG. 1, an authentication system may include a target client 110, a biometric information storage server 120, and a decryption key storage server 130.

The target client 110 is one of all clients that acquire biometric information, request user authentication from an external device based on the biometric information, and acquire authentication results or information according to the authentication results. There can be at least one client in the authentication system. In some exemplary embodiments of the present invention, a client may be a biometric information recognizer that acquires biometric information directly from a user or a terminal that acquires biometric information from the biometric information recognizer.

In an exemplary embodiment, the biometric information recognizer may be defined as a device including a sensor that senses biometric information. For example, the biometric information may include a user's fingerprint information, electrocardiogram (ECG) information, electromyography (EMG) information, iris information, blood vessel information, vein information, voice information, face information, palm line information, etc., and the sensor denotes a device that senses at least one of the pieces of biometric information.

In an exemplary embodiment, the terminal that acquires the biometric information from the biometric information recognizer denotes a device that acquires biometric information by performing communication with the biometric information recognizer. The terminal may include not only fixed terminals, such as a desktop computer, but also mobile terminals, such as a cellular phone, a smart phone, a tablet, a laptop computer, a personal digital assistant (PDA), and a wearable device (e.g., a wearable watch and a wearable band).

Also, the target client 110 may be defined as a client that requests user authentication from the biometric information storage server 120 or the decryption key storage server 130 among at least one client included in the authentication system.

The biometric information storage server 120 may be defined as a server that previously stores biometric information of at least one client. Here, the previously stored biometric information may be referred to as biometric information for registration and may serve as reference information for authenticating a user.

The decryption key storage server 130 may store at least one decryption key. Here, the decryption key may denote information for decrypting biometric information encrypted by a client.

Figure 2:
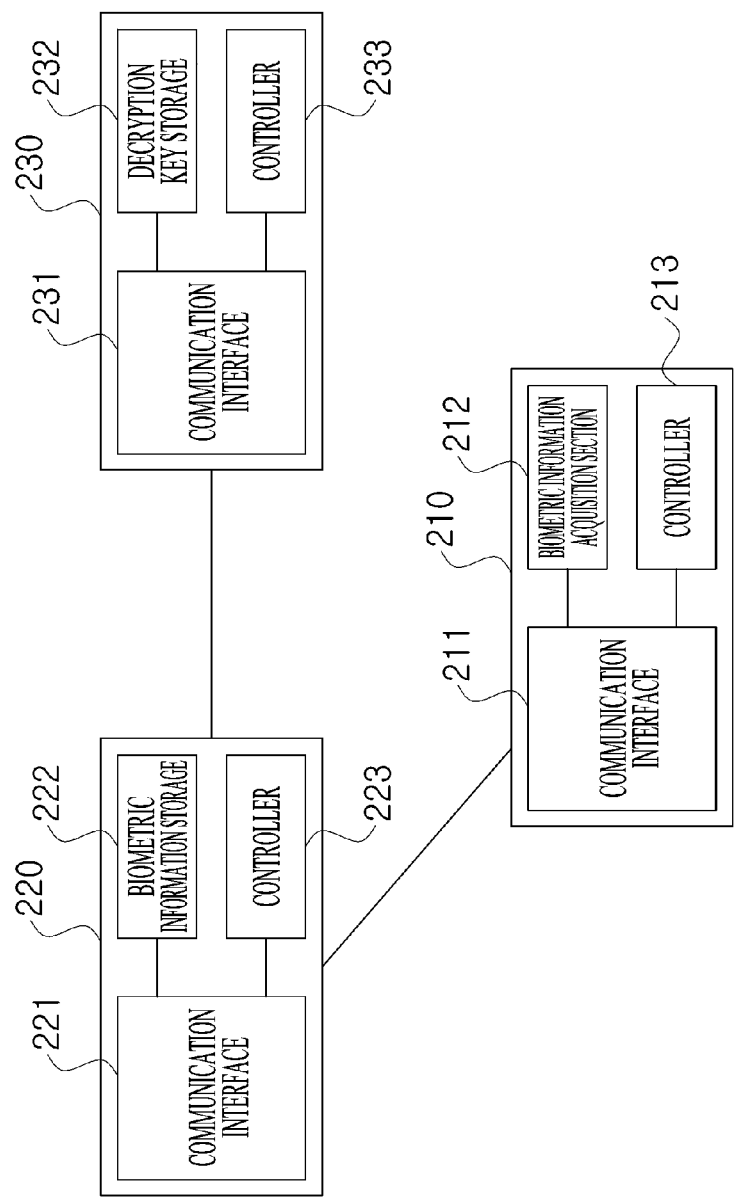
FIG. 2 is a diagram illustrating an authentication system according to an exemplary embodiment in more detail.

In the authentication systems of FIGS. 1 and 2, decryption of encrypted biometric information may be performed by one server (e.g., the decryption key storage server 130). The decryption performed by the single server may be referred to as a single stage decryption below.

The encryption and the decryption may be performed by a symmetric encryption/decryption method or an asymmetric encryption/decryption method. Here, the symmetric encryption/decryption method indicates an algorithm or a method in which an encryption key that is used for encryption is identical to a decryption key that is used for interpreting, that is, decrypting, a password. On the other hand, the asymmetric encryption/decryption method indicates an algorithm in which an encryption key and a decryption key are different.

Examples of a symmetric key include Triple Data Encryption Standard (3DES), Advanced Encryption Standard (AES), SEED, Academy-Research Institute-Agency (ARIA) DES, CRYPTON, RIJNDAEL, CAST256, RC6, RC5, RC4, RC2, TWOFISH, MARS, SERPENT, SKIPJACK, International Data Encryption Algorithm (IDEA), SEAL, DESX, BLOWFISH, CAST128, SAFER, etc., and examples of an asymmetric key include Rivest Shamir Adleman (RSA), ElGamal, Elliptic Curve Crypto (ECC) system, Digital Signature Standard (DSS), Public Key Partners (PKP), etc. It is self-evident that the symmetric key and the asymmetric key are not limited to the above examples, and information which has not been mentioned above but is used in the symmetric encryption/decryption method or the asymmetric encryption/decryption method may also be included in the symmetric key or the asymmetric key.

Also the decryption key storage server 130 may match the biometric information previously stored in the biometric information storage server 120 to biometric information acquired from the target client 110. Accordingly, the decryption key storage server 130 may be referred to as a matching server.

A client, the biometric information storage server 120, and the decryption key storage server 130 are classified according to their roles, and hardware configurations thereof may be identical or similar to each other. For example, the biometric information storage server 120 and the decryption key storage server 130 may be implemented as server devices or implemented as the aforementioned fixed terminals or mobile terminals.

According to some exemplary embodiments of the present invention, a registration operation and an authentication operation may be performed in the authentication system. Here, the authentication operation denotes an operation of determining whether a user of the biometric information acquired from the target client 110 is a user of the biometric information previously stored in the biometric information storage server 120, and the registration operation denotes a preceding operation for performing the authentication operation.

The target client 110 may designate the biometric information storage server 120 as a server for storing biometric information for registration and designate the decryption key storage server 130 as a server for storing a decryption key during the registration operation. Also, in the biometric information storage server 120 and the decryption key storage server 130, at least one client including the target client 110 may be designated as a device that requires user authentication. Accordingly, the target client 110 is subjected to user authentication through communication with pre-designated servers so that security for the user authentication can be improved.

Also, the target client 110 may provide biometric information for registration to the biometric information storage server 120 during the registration operation. To this end, the target client 110 may acquire the biometric information for registration from a user, encrypt the acquired biometric information for registration using a unique encryption key, and then transmit the encrypted biometric information for registration to the biometric information storage server 120. In other words, the target client 110 provides the encrypted biometric information for registration to the biometric information storage server 120, but does not provide a decryption key for decrypting the encrypted biometric information for registration to the biometric information storage server 120. Accordingly, although the encrypted biometric information for registration is acquired, the biometric information storage server 120 cannot decrypt the biometric information for registration. For this reason, since the corresponding decryption key is not acquired even when the biometric information storage server 120 is hacked and the encrypted biometric information for registration is leaked, it is not possible to decrypt the encrypted biometric information for registration. Consequently, the probability of leakage of biometric information caused by the biometric information storage server 120 being hacked is lowered.

Further, the target client 110 may provide an identifier of the target client 110 to the biometric information storage server 120 together with the encrypted biometric information for registration during the registration operation. Here, the identifier of the target client 110 indicates information for distinguishing the target client 110 from a plurality of other clients. Any form of information for identifying the target client 110, for example, a serial number of the target client 110, a turn of the target client 110 among clients included in the authentication system, etc., is suitable as the identifier of the target client 110.

Specifically, the biometric information storage server 120 may acquire encrypted biometric information for registration from other clients as well as the target client 110 and provide the encrypted biometric information for registration to the decryption key storage server 130 during the authentication operation. However, when encrypted biometric information for registration of clients other than the target client 110 is provided to the decryption key storage server 130 in spite of a user authentication request from the target client 110, the decryption key storage server 130 may decrypt the encrypted biometric information for registration of the clients other than the target client 110, which is inefficient. To prevent such inefficiency, the target client 110 provides the identifier of the target client 110 to the biometric information storage server 120 together with the encrypted biometric information, and when a user authentication request is received from the target client 110, the biometric information storage server 120 may provide only the encrypted biometric information for registration corresponding to the identifier of the target client 110 among pieces of encrypted biometric information for registration stored therein to the decryption key storage server 130.

Moreover, the target client 110 may provide a decryption key to the decryption key storage server 130 during the registration operation. Here, the decryption key corresponds to the unique encryption key of the target client 110, and denotes information for decrypting the biometric information encrypted by the target client 110.

More specifically, the decryption key storage server 130 may acquire decryption keys from other clients as well as the target client 110, and may decrypt the encrypted biometric information for registration and encrypted biometric information for authentication during the authentication operation. However, since decryption keys that do not correspond to the encrypted biometric information for registration and the encrypted biometric information for authentication are used when the decryption key storage server 130 performs decryption using all decryption keys stored therein, decryption efficiency is degraded. To prevent such a problem, the decryption key storage server 130 may extract a decryption key corresponding to the identifier of the target client 110 from all of the decryption keys stored therein and decrypt the encrypted biometric information for registration and the encrypted biometric information for authentication using the extracted decryption key.

In an exemplary embodiment, the target client 110 may encrypt the biometric information for registration and the biometric information for authentication acquired during the authentication operation using the same encryption key. In this case, the target client 110 may provide a decryption key for decrypting both the encrypted biometric information for registration and the encrypted biometric information for authentication to the decryption key storage server 130.

In another exemplary embodiment, the target client 110 may encrypt the biometric information for registration and the biometric information for authentication acquired during the authentication operation using different encryption keys. In this case, the target client 110 may separately provide a decryption key for decrypting the encrypted biometric information for registration and a decryption key for decrypting the encrypted biometric information for authentication.

Also, in an exemplary embodiment of the present invention, the target client 110 may provide the identifier thereof to the decryption key storage server 130 together with a decryption key. Accordingly, when encrypted biometric information corresponding to the identifier of the target client 110 is acquired from the biometric information storage server 120, the decryption key storage server 130 may decrypt the encrypted biometric information using the decryption key corresponding to the identifier of the target client 110.

The target client 110 acquires and encrypts the biometric information for authentication and provides the encrypted biometric information for authentication to the biometric information storage server 120 during the authentication operation. The biometric information storage server 120 provides the encrypted biometric information for registration and the encrypted biometric information for authentication to the decryption key storage server 130. After decrypting the encrypted biometric information for registration and the encrypted biometric information for authentication using the decryption key, the decryption key storage server 130 matches the decrypted biometric information for registration to the decrypted biometric information for authentication and provides the matching result to the biometric information storage server 120 or the target client 110. Subsequently, the biometric information storage server 120 provides information that the user has been authenticated to the target client 110 when the matching result indicates that the decrypted biometric information for registration and the decrypted biometric information for authentication match, and the biometric information storage server 120 provides information that the user has not been authenticated to the target client 110 when the matching result indicates that the decrypted biometric information for registration and the decrypted biometric information for authentication do not match.

The authentication operation in the authentication system will be described in more detail with reference to FIG. 2.

FIG. 2 is a diagram illustrating an authentication system according to an exemplary embodiment in further detail.

Referring to FIG. 2, the authentication system may include a target client 210, a biometric information storage server 220, and a decryption key storage server 230. Here, the descriptions of the target client 110, the biometric information storage server 120, and the decryption key storage server 130 of FIG. 1 are respectively applied to the target client 210, the biometric information storage server 220, and the decryption key storage server 230 as they are.

First, the target client 210 may include a communication interface 211, a biometric information acquisition section 212, and a controller 213.

The communication interface 211 may include one or more modules that enable network communication between the target client 210 and an external device. For example, the communication interface 211 includes a wireless communication module, such as a wireless Internet interface including a wireless local area network (WLAN) interface, a wireless fidelity (WiFi) interface, etc. and a short-range communication interface including a Bluetooth interface, a ZigBee interface, etc., and may communicate data with an outside of the target client 210 through the wireless communication module. It should be self-evident that the communication interface 211 may include a wired communication module as well as the wireless communication module. This description of the communication interface 211 may be applied to a communication interface 221 of the biometric information storage server 220 and a communication interface 231 of the decryption key storage server 230.

The biometric information acquisition section 212 may acquire biometric information of a user. For example, the biometric information acquisition section 212 may acquire the biometric information of the user from the communication interface 211, or may acquire the biometric information directly from the user when the biometric information acquisition section 212 is in the form of a sensor. In another example, when the biometric information is fingerprint information, the biometric information acquisition section 212 may acquire a fingerprint image as the biometric information or acquire information on feature points extracted from the fingerprint image as the biometric information.

The controller 213 controls overall operation of the target client 210. In particular, the controller 213 receives a registration request or an authentication request from a user or an external device, encrypts biometric information, and requests user authentication.

In some exemplary embodiments of the present invention, when a registration request is received, the controller 213 performs the above-described registration operation. As described above, during the registration operation, the controller 213 acquires biometric information for registration from a user, encrypts the biometric information for registration using a unique encryption key, and provides the encrypted biometric information for registration to the biometric information storage server 220. Also, the controller 213 provides a decryption key for decrypting the encrypted biometric information for registration to the decryption key storage server 230.

In some exemplary embodiments of the present invention, when an authentication request is received, the controller 213 performs the authentication operation. First, the controller 213 acquires biometric information for authentication from the biometric information acquisition section 212 during the authentication operation. Here, the biometric information for authentication is distinguished from the biometric information for registration, and may be defined as biometric information that is compared with the biometric information for registration to authenticate a user.

Also, the controller 213 encrypts the biometric information for authentication using the unique encryption key. Here, either a symmetric key or an asymmetric key may be the unique encryption key. However, the unique encryption key should correspond to the decryption key that has been provided to the decryption key storage server 230 during the registration operation. In other words, the controller 213 should provide the decryption key to the decryption key storage server 230 so that the decryption key storage server 230 may decrypt the biometric information for authentication.

In an exemplary embodiment, the controller 213 may update the unique encryption key with a new encryption key. In this case, the controller 213 should provide a decryption key corresponding to the new encryption key to the decryption key storage server 230 before performing encryption with the new encryption key, specifically, before the decryption key storage server 230 decrypts biometric information encrypted with the new encryption key.

In some exemplary embodiments of the present invention, the controller 213 may assign an attribute for distinguishing between biometric information for registration and biometric information for authentication to the biometric information for authentication and the biometric information for registration.

In an exemplary embodiment, the attribute may include a use identifier that indicates a use of the biometric information. In this case, the controller 213 may generate and assign the use identifier to the biometric information according to a use of the biometric information.

In another exemplary embodiment, the attribute may include a validity period during which the biometric information is usable. In this case, the controller 213 may generate a registration validity period indicating a validity period of biometric information for registration or an authentication validity period indicating a validity period of biometric information for authentication, and assign the registration validity period or the authentication validity period to the biometric information. Here, the registration validity period may be longer than the authentication validity period.

For example, when biometric information is acquired from the biometric information acquisition section 212 during the registration operation, the controller 213 may recognize the acquired biometric information as biometric information for registration and assign a first use identifier indicating biometric information for registration and/or a registration validity period to the acquired biometric information. In another example, when biometric information is acquired from the biometric information acquisition section 212 during the authentication operation, the controller 213 may recognize the acquired biometric information as biometric information for authentication and assign a second use identifier indicating biometric information for authentication and/or an authentication validity period to the acquired biometric information.

According to some exemplary embodiments of the present invention, the controller 213 may request user authentication from the biometric information storage server 220 during the authentication operation. However, the present invention is not limited to this case, and the controller 213 may request the user authentication from a server other than the biometric information storage server 220 or the decryption key storage server 230, and the server receiving the user authentication request may transfer the user authentication request to the biometric information storage server 220.

The controller 213 may provide the encrypted biometric information for authentication to the biometric information storage server 220. When the controller 213 provides the encrypted biometric information for authentication to the server, the server may provide the encrypted biometric information for authentication to the biometric information storage server 220.

The controller 213 may provide an identifier of the target client 210 to the biometric information storage server 220 together with the encrypted biometric information for authentication. The biometric information storage server 220 or the decryption key storage server 230 may use the identifier of the target client 210 to determine that the encrypted biometric information for authentication has been provided by the target client 210.

However, the present invention is not limited to this case, and the controller 213 may provide the encrypted biometric information for authentication and the identifier of the target client 210 to the decryption key storage server 230. In this case, the decryption key storage server 230 may acquire the encrypted biometric information for registration from the biometric information storage server 220, acquire the encrypted biometric information for authentication from the target client 210, and decrypt the encrypted biometric information for registration and the encrypted biometric information for authentication using a decryption key corresponding to the identifier of the target client 210.

In some exemplary embodiments of the present invention, the biometric information storage server 220 may include the communication interface 221, a biometric information storage 222, and a controller 223.

The communication interface 221 may include one or more modules that enable network communication between the biometric information storage server 220 and an external device. The description of the communication interface 211 of the target client 210 may be applied to the communication interface 221 as it is.

The biometric information storage 222 may store biometric information for registration acquired from each client during the registration operation. Here, the biometric information for registration stored in the biometric information storage 222 may be encrypted by each of the clients that have provided the biometric information for registration. Accordingly, the biometric information storage server 220 can only store the encrypted biometric information for registration and cannot decrypt the encrypted biometric information for registration without acquiring decryption keys.

The controller 223 controls overall operation of the biometric information storage server 220.

In an exemplary embodiment, the controller 223 may acquire the encrypted biometric information for authentication and the identifier of the target client 210 according to a user authentication request during the authentication operation. Subsequently, the controller 223 may provide the encrypted biometric information for registration, the encrypted biometric information for authentication, and the identifier of the target client 210 to the decryption key storage server 230 for decryption of the encrypted biometric information for registration and the biometric information for authentication. However, when the controller 223 provides all encrypted biometric information for registration stored in the biometric information storage 222 to the decryption key storage server 230, not only is a transmission amount from the biometric information storage server 220 to the decryption key storage server 230 increased, but it is also inefficient in that the decryption key storage server 230 should acquire all of the encrypted biometric information for registration. Accordingly, the controller 223 may extract encrypted biometric information for registration corresponding to the identifier of the target client 210 from all of the encrypted biometric information for registration, and provide only the encrypted biometric information for registration corresponding to the identifier of the target client 210 to the decryption key storage server 230.

In an exemplary embodiment, the controller 223 may check a registration validity period of the encrypted biometric information for registration and remove the encrypted biometric information for registration when the registration validity period has expired.

In some exemplary embodiments of the present invention, the decryption key storage server 230 may include the communication interface 231, a decryption key storage 232, and a controller 233.

The communication interface 231 includes one or more modules that enable network communication between the decryption key storage server 230 and an external device. The description of the communication interface 211 of the target client 210 may be applied to the communication interface 231 as it is.

The decryption key storage 232 may store a decryption key acquired from each client during the registration operation.

The controller 233 controls overall operation of the decryption key storage server 230.

The controller 233 may acquire encrypted biometric information for registration, encrypted biometric information for authentication, and the identifier of the target client 210 during the authentication operation. Here, the encrypted biometric information for registration may correspond to the identifier of the target client 210.

In an exemplary embodiment, the decryption key storage server 230 may receive the encrypted biometric information for registration, the encrypted biometric information for authentication, and the identifier of the target client 210 from the biometric information storage server 220. In this case, even when the decryption key storage server 230 communicates with the biometric information storage server 220, the decryption key storage server 230 may decrypt the encrypted biometric information for registration and the encrypted biometric information for authentication without communicating with the target client 210.

In another exemplary embodiment, according to a user authentication request of the target client 210, the decryption key storage server 230 may acquire the encrypted biometric information for authentication and the identifier of the target client 210 from the target client 210 and acquire the encrypted biometric information for registration from the biometric information storage server 220.

The controller 233 may extract a decryption key corresponding to the identifier of the target client 210 from decryption keys stored in the decryption key storage 232 to decrypt the encrypted biometric information for registration and the encrypted biometric information for authentication.

The controller 233 may decrypt the encrypted biometric information for registration and the encrypted biometric information for authentication using the decryption key corresponding to the identifier of the target client 210.

Also, the controller 233 may determine whether or not the decrypted biometric information for registration and the decrypted biometric information for authentication match. Here, the biometric information for registration and the biometric information for authentication matching each other may denote that the biometric information for registration and the biometric information for authentication are similar enough to indicate that they are biometric information of the same user.

The controller 233 extracts a similarity between the decrypted biometric information for registration and the decrypted biometric information for authentication to determine whether or not the decrypted biometric information for registration and the decrypted biometric information for authentication match. The controller 233 may determine that the decrypted biometric information for registration and the decrypted biometric information for authentication match when the extracted similarity is greater than or equal to a predetermined reference value.

For example, when biometric information is fingerprint information, the controller 233 may extract feature points of the decrypted biometric information for registration and feature points of the decrypted biometric information for authentication. Also, the controller 233 may extract a similarity between the feature points of the decrypted biometric information for registration and the feature points of the decrypted biometric information for authentication and determine that the feature points of the decrypted biometric information for registration and the feature points of the decrypted biometric information for authentication match when the similarity is greater than or equal to the predetermined reference value.

The controller 233 may provide the matching result to the biometric information storage server 220. In this case, when it has been determined that the biometric information for registration and the biometric information for authentication match, the controller 223 of the biometric information storage server 220 may provide a result indicating that the user has been authenticated or information involved in the result (e.g., service information provided by the biometric information storage server 220 to the target client 210 when the user is authenticated) to the target client 210. Also, when it has been determined that the biometric information for registration and the biometric information for authentication do not match, the controller 223 of the biometric information storage server 220 may provide a result indicating that the user has not been authenticated to the target client 210.

However, in an exemplary embodiment, the controller 233 may provide the matching result directly to the target client 210.

In an exemplary embodiment, the controller 233 may check a registration validity period of the encrypted biometric information for authentication and remove the encrypted biometric information for registration when the registration validity period has expired.

In some exemplary embodiments of the present invention, matching between the decrypted biometric information for registration and the decrypted biometric information for authentication may be performed by the biometric information storage server 220.

For example, according to a user authentication request of the target client 210, the controller 223 may acquire the identifier of the target client 210 and encrypted biometric information for authentication from the target client 210 and extract encrypted biometric information for registration corresponding to the identifier of the target client 210 from all encrypted biometric information for registration stored in the biometric information storage 222. Unlike in the exemplary embodiments described above, the controller 223 may acquire the decryption key corresponding to the identifier of the target client 210 from the decryption key storage server 230 and decrypt the encrypted biometric information for registration and the encrypted biometric information for authentication using the decryption key corresponding to the identifier of the target client 210 without providing the encrypted biometric information for registration, the encrypted biometric information for authentication, and the identifier of the target client 210 to the decryption key storage server 230. Subsequently, the controller 223 may determine whether or not the decrypted biometric information for registration and the decrypted biometric information for authentication match and provide a user authentication result according to the matching result to the target client 210.

Since encrypted biometric information for registration and a decryption key are leaked together when the encrypted biometric information for registration and the decryption key are stored in one server and the server is hacked, biometric information of a user may be abused for a crime.

On the other hand, like in the exemplary embodiments described above, encrypted biometric information for registration is stored in the biometric information storage server 220, and a decryption key is stored in the decryption key storage server 230 that is separate from the biometric information storage server 220. Since the decryption key is not leaked when the biometric information storage server 220 is hacked and the encrypted biometric information for registration is leaked, the encrypted biometric information for registration cannot be decrypted. Also, since the encrypted biometric information for registration is not leaked when the decryption key storage server 230 is hacked and the decryption key is leaked, no living body is exposed. Therefore, according to exemplary embodiments of the present invention, encrypted biometric information for registration and a decryption key are stored in different servers so that security of the authentication system can be improved.

Figure 3:
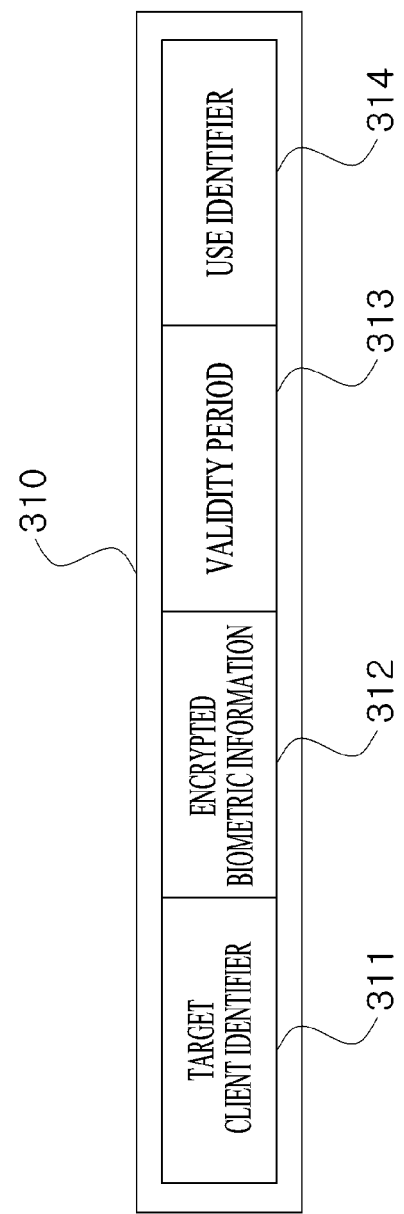
FIG. 3 is a diagram illustrating a configuration of biometric information for registration or biometric information for authentication according to an exemplary embodiment.

FIG. 3 is a diagram illustrating a configuration of biometric information for registration or biometric information for authentication according to an exemplary embodiment.

Referring to FIG. 3, biometric information for registration and biometric information for authentication may be transmitted and received among a target client, a biometric information storage server, and a decryption key storage server in the form of a biometric information message 310. The biometric information message 310 may be generated by the target client.

Specifically, the biometric information message 310 may include a target client identifier field 311, an encrypted biometric information field 312, a validity period field 313, and a use identifier field 314.

An identifier of the target client may be included in the target client identifier field 311, and the encrypted biometric information for registration or the encrypted biometric information for authentication may be included in the encrypted biometric information field 312.

Also, a registration validity period or an authentication validity period may be included in the validity period field 313, and a first use identifier that may indicate the biometric information for registration or a second use identifier that may the indicate biometric information for authentication may be included in the use identifier field 314.

The example of FIG. 3 shows that the biometric information message 310 includes all of the target client identifier field 311, the encrypted biometric information field 312, the validity period field 313, and the use identifier 314. However, the present invention is not limited to this case, and the biometric information message 310 may include the target client identifier field 311, the encrypted biometric information field 312, and the validity period field 313 or the use identifier field 314 or may include only the target client identifier field 311 and the encrypted biometric information field 312.

<Authentication System Using Multi-Stage Decryption>

Figure 4:
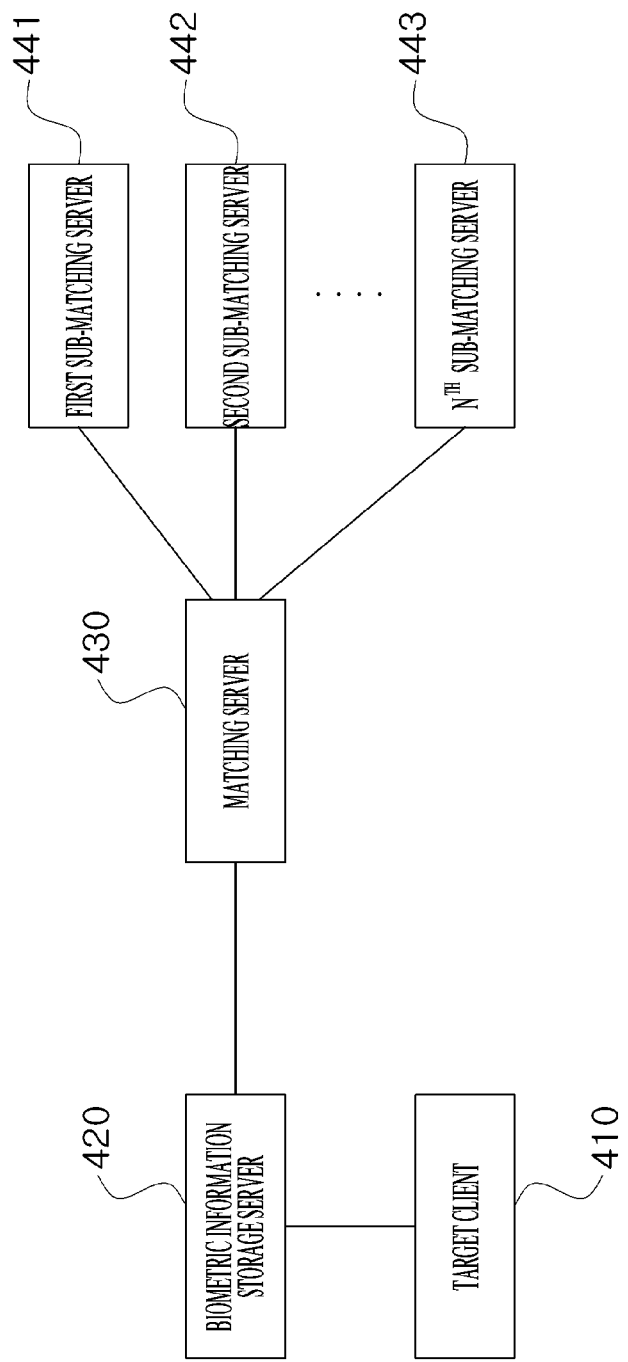
FIG. 4 is a diagram illustrating an authentication system according to an exemplary embodiment when there are sub-matching servers.

FIG. 4 is a diagram illustrating an authentication system according to an exemplary embodiment when there are sub-matching servers.

Referring to FIG. 4, the authentication system may include a target client 410, a biometric information storage server 420, a matching server 430, and a plurality of sub-matching servers 441, 442, and 443. In the example of FIG. 4, there are the plurality of sub-matching servers 441, 442, and 443. However, the present invention is not limited to this case, and there may be one sub-matching server in the authentication system.

In comparison with the exemplary embodiments of FIGS. 1 and 2, the above-described configurations of the target client 110 of FIG. 1 and the target client 210 of FIG. 2 may be applied to the target client 410 as they are, and the above-described configurations of the biometric information storage server 120 of FIG. 1 and the biometric information storage server 220 of FIG. 2 may be applied to the biometric information storage server 420 as they are.

However, unlike the authentication systems of FIGS. 1 and 2, decryption of encrypted biometric information may be performed by a plurality of servers rather than one server in the authentication system of FIG. 4. Decryption being performed by a plurality of servers may be referred to as multi-stage decryption below. Specifically, in the authentication system of FIG. 4, decryption of encrypted biometric information may be performed by the plurality of sub-matching servers 441, 442, and 443 and the matching server 430. In other words, operations of the decryption key storage servers in FIGS. 1 and 2 may be performed by the matching server 430 and the plurality of sub-matching servers 441, 442, and 443 in a distributed manner.

In some exemplary embodiments of the present invention, the registration operation and the authentication operation may be performed in an authentication system.

During the registration operation, the target client 410 may designate the biometric information storage server 420 as a server for storing biometric information for registration. Also, the target client 410 may designate a server for storing a decryption key. For example, the target client 410 may designate the plurality of sub-matching servers 441, 442, and 443 as servers for storing a decryption key, or designate the matching server 430 and the plurality of sub-matching servers 441, 442, and 443 as servers for storing a decryption key. Since a server storing a decryption key performs decryption, the number of decryption operations may be determined according to the number of servers designated as servers for storing a decryption key by the target client 410.

The biometric information storage server 420, the matching server 430, and the plurality of sub-matching servers 441, 442, and 443 may designate at least one client including the target client 410 as a device that requests user authentication.

Also, the target client 410 may provide biometric information for registration to the biometric information storage server 420 during the registration operation. To this end, the target client 410 may acquire the biometric information for registration, encrypt the acquired biometric information for registration using a unique encryption key, and then transmit the encrypted biometric information for registration to the biometric information storage server 420. Also, the target client 410 may provide a decryption key corresponding to the unique encryption key to the matching server 430 and/or the plurality of sub-matching servers 441, 442, and 443.

According to an exemplary embodiment, the target client 410 may consecutively encrypt biometric information for registration when encryption is performed. For example, when n encryption keys are used, the target client 410 may encrypt biometric information for registration by consecutively applying first to $n^{th}$ encryption keys to the biometric information for registration. Also, the target client 410 may provide n decryption keys corresponding to the n encryption keys to the matching server 430 and/or the plurality of sub-matching servers 441, 442, and 443 on a one-to-one basis. As an example, when decryption is performed by the matching server 430 and the plurality of sub-matching servers 441, 442, and 443, the target client 410 may provide the first decryption key to the matching server 430 and provide the other decryption keys to the plurality of sub-matching servers 441, 442, and 443 on a one-to-one basis. As another example, when decryption is performed by the plurality of sub-matching servers 441, 442, and 443, the target client 410 may provide the first decryption key to the first sub-matching server 441 and provide the other decryption keys to the plurality of sub-matching servers 442 and 443 on a one-to-one basis.

According to another exemplary embodiment, the target client 410 may encrypt biometric information for registration in a distributed manner when encryption is performed. For example, when n encryption keys are used, the target client 410 may divide the biometric information for registration into n pieces and then encrypt the n divided pieces of biometric information for registration by applying n encryption keys to the n pieces of biometric information for registration on a one-to-one basis. For example, when three encryption keys are used, the target client 410 may encrypt each of three divided pieces of biometric information for registration by respectively applying first to third encryption keys to first to third divided pieces of biometric information for registration. Also, the target client 410 may provide n decryption keys corresponding to the n encryption keys to the matching server 430 and/or the plurality of sub-matching servers 441, 442, and 443 on a one-to-one basis.

Further, the target client 410 may provide an identifier of the target client 410 to the biometric information storage server 420 during the registration operation. The biometric information storage server 420 may use the identifier of the target client 410 to identify encrypted biometric information acquired from the target client 410 from encrypted biometric information acquired from a plurality of clients, and the matching server 430 and/or the plurality of sub-matching servers 441, 442, and 443 may use the identifier of the target client 410 to identify the decryption key acquired from the target client 410 among the decryption keys acquired from the plurality of clients.

In some exemplary embodiments of the present invention, the target client 410 previously stores encrypted biometric information for registration and identifiers of the plurality of clients separately acquired from the plurality of clients. When an authentication request is received from the target client 410, the biometric information storage server 420 performs the authentication operation. First, the target client 410 acquires biometric information for authentication from a user or an external device (e.g., an iris recognizer) during the authentication operation.

The target client 410 encrypts the biometric information for authentication using a unique encryption key. Here, the unique encryption key should correspond to a decryption key provided to the matching server 430 and/or the plurality of sub-matching servers 441, 442, and 443 during the registration operation. In other words, the target client 410 should provide the decryption key to the matching server 430 and/or the plurality of sub-matching servers 441, 442, and 443 so that decryption may be performed by the matching server 430 and/or the plurality of sub-matching servers 441, 442, and 443.

In some exemplary embodiments of the present invention, the target client 410 may assign an attribute (e.g., a use identifier and a validity period) for distinguishing between biometric information for registration and biometric information for authentication to the biometric information for authentication and the biometric information for registration.

In some exemplary embodiments of the present invention, the target client 410 may request user authentication from the biometric information storage server 420 during the authentication operation. However, the present invention is not limited to this case, and the target client 410 may request user authentication from a server other than the biometric information storage server 420 or the matching server 430, and the server receiving the user authentication request may transfer the user authentication request to the biometric information storage server 420.

The target client 410 may provide the encrypted biometric information for authentication to the biometric information storage server 420. When the target client 410 provides the encrypted biometric information for authentication to the server, the server may provide the encrypted biometric information for authentication to the biometric information storage server 420.

Also, the target client 410 may provide the identifier of the target client 410 to the biometric information storage server 420 together with the encrypted biometric information for authentication. However, the present invention is not limited to this case, and the target client 410 may provide the encrypted biometric information for authentication and the identifier of the target client 410 to the matching server 430.

In some exemplary embodiments of the present invention, the biometric information storage server 420 may acquire the encrypted biometric information for authentication and the identifier of the target client 410 according to a user authentication request. Subsequently, the biometric information storage server 420 may provide the encrypted biometric information for registration, the encrypted biometric information for authentication, and the identifier of the target client 410 to the matching server 430 for decryption of the encrypted biometric information for registration and the encrypted biometric information for authentication. The biometric information storage server 420 may extract encrypted biometric information for registration corresponding to the identifier of the target client 410 from all encrypted biometric information for registration, and provide only the encrypted biometric information for registration corresponding to the identifier of the target client 410 to the matching server 430.

Also, the biometric information storage server 420 may check a registration validity period of the encrypted biometric information for registration and remove the encrypted biometric information for registration when the registration validity period has expired.

In some exemplary embodiments of the present invention, the matching server 430 and/or the plurality of sub-matching servers 441, 442, and 443 previously store decryption keys and identifiers of a plurality of clients separately acquired from the plurality of clients. The matching server 430 may acquire the encrypted biometric information for registration, the encrypted biometric information for authentication, and the identifier of the target client 410 during the authentication operation. Also, the matching server 430 may provide at least some of the encrypted biometric information for registration, at least some of the encrypted biometric information for authentication, and the identifier of the target client 410 to the plurality of sub-matching servers 441, 442, and 443.

The matching server 430 and/or the plurality of sub-matching servers 441, 442, and 443 may extract the decryption key corresponding to the identifier of the target client 410 from the previously stored decryption keys to decrypt the encrypted biometric information for registration and the encrypted biometric information for authentication. The matching server 430 and/or the plurality of sub-matching servers 441, 442, and 443 may decrypt the encrypted biometric information for registration and the encrypted biometric information for authentication using the decryption key corresponding to the identifier of the target client 410.

In an exemplary embodiment, the matching server 430 and/or the plurality of sub-matching servers 441, 442, and 443 may "consecutively" decrypt the encrypted biometric information for registration and the encrypted biometric information for authentication.

For example, when the target client 410 provides the first decryption key among the n decryption keys to the matching server 430 and provides the other decryption keys to the plurality of sub-matching servers 441, 442, and 443 on a one-to-one basis, the matching server 430 decrypts the encrypted biometric information for registration and the encrypted biometric information for authentication using the first decryption key. Also, the first sub-matching server 441 decrypts the biometric information for registration and the biometric information for authentication decrypted by the matching server 430 using a second decryption key. The second sub-matching server 442 and the $N^{th}$ sub-matching server 443 also consecutively decrypt the biometric information for registration and the biometric information for authentication using the previously stored decryption key corresponding to the identifier of the target client 410. In this case, decryption may ultimately be completed by the $N^{th}$ sub-matching server 443, and the $N^{th}$ sub-matching server 443 may transmit the decrypted biometric information for registration and the decrypted biometric information for authentication to the matching server 430 so that matching may be performed by the matching server 430. However, the present invention is not limited to this case, and the $N^{th}$ sub-matching server 443 may match the decrypted biometric information for registration to the decrypted biometric information for authentication. In another example, when the target client 410 does not provide any decryption key among n decryption keys to the matching server 430 and provides the n decryption keys to the plurality of sub-matching servers 441, 442, and 443 on a one-to-one basis, the matching server 430 provides the encrypted biometric information for registration and the encrypted biometric information for authentication to the first sub-matching server 441. The first sub-matching server 441 decrypts the biometric information for registration and the biometric information for authentication acquired from the matching server 430 using the first decryption key. Also, the second sub-matching server 442 and the $N^{th}$ sub-matching server 443 consecutively decrypt the biometric information for registration and the biometric information for authentication using the previously stored decryption key corresponding to the identifier of the target client 410. Even in this case, decryption may ultimately be completed by the $N^{th}$ sub-matching server 443, and the $N^{th}$ sub-matching server 443 may transmit the decrypted biometric information for registration and the decrypted biometric information for authentication to the matching server 430 so that matching may be performed by the matching server 430, or the $N^{th}$ sub-matching server 443 may match the decrypted biometric information for registration to the decrypted biometric information for authentication.

In another exemplary embodiment, the matching server 430 and/or the plurality of sub-matching servers 441, 442, and 443 may decrypt the encrypted biometric information for registration and the encrypted biometric information for authentication "in a distributed manner."

For example, when the matching server 430 acquires the first decryption key among the n decryption keys, a first piece of the encrypted biometric information for registration among n divided pieces of the encrypted biometric information for registration, and a first piece of the encrypted biometric information for authentication among n divided pieces of the encrypted biometric information for authentication, and the plurality of sub-matching servers 441, 442, and 443 acquire one of the other decryption keys, one piece of the encrypted biometric information for registration among the other pieces of the encrypted biometric information for registration and one piece of the encrypted biometric information for authentication among the other pieces of the encrypted biometric information for authentication, the matching server 430 decrypts the first piece of encrypted biometric information for registration and the first piece of encrypted biometric information for authentication using the first decryption key. Also, the plurality of sub-matching servers 441, 442, and 443 decrypt the divided pieces of encrypted biometric information for registration and the divided pieces of encrypted biometric information for authentication separately stored in the plurality of sub-matching servers 441, 442, and 443 using the decryption key corresponding to the identifier of the target client 410 stored in each of the plurality of sub-matching servers 441, 442, and 443. The matching server 430 may acquire the divided pieces of biometric information for registration and the divided pieces of biometric information for authentication decrypted by the plurality of sub-matching servers 441, 442, and 443, acquire the decrypted biometric information for registration by integrating the acquired pieces of biometric information for registration, and acquire the decrypted biometric information for authentication by integrating the acquired pieces of biometric information for authentication.

In another example, when the plurality of sub-matching servers 441, 442, and 443 acquire one of the n decryption keys, one of the n divided pieces of the encrypted biometric information for registration, and one of the n divided pieces of the encrypted biometric information for authentication, the plurality of sub-matching servers 441, 442, and 443 decrypt the divided pieces of encrypted biometric information for registration and the divided pieces of encrypted biometric information for authentication separately stored in the plurality of sub-matching servers 441, 442, and 443 using the decryption key corresponding to the identifier of the target client 410 stored in each of the plurality of sub-matching servers 441, 442, and 443. Also, the matching server 430 may acquire the divided pieces of biometric information for registration and the divided pieces of biometric information for authentication decrypted by the plurality of sub-matching servers 441, 442, and 443, acquire the decrypted biometric information for registration by integrating the acquired pieces of biometric information for registration, and acquire the decrypted biometric information for authentication by integrating the acquired pieces of biometric information for authentication.

In addition, the matching server 430 may determine whether or not the decrypted biometric information for registration and the decrypted biometric information for authentication match. Since the descriptions of FIGS. 1 and 2 may be applied to the determination as they are, a detailed description of the determination will be omitted.

Further, the matching server 430 may provide the matching result to the biometric information storage server 420. Alternatively, the matching server 430 may provide the matching result directly to the target client 410.

In an exemplary embodiment, the matching server 430 may check a registration validity period of the encrypted biometric information for registration and remove the encrypted biometric information for registration when the registration validity period has expired.

As described above, since the encrypted biometric information for registration and the decryption key are stored in different servers, security of the authentication system can be improved. Moreover, in exemplary embodiments of FIG. 4, there are a plurality of decryption keys. The plurality of decryption keys are stored not in one server but in a plurality of servers in a distributed manner, and all of the plurality of decryption keys are required to decrypt the encrypted biometric information. In other words, if decryption keys are separately stored in the matching server 430 and the plurality of sub-matching servers 441, 442, and 443, even when any one of the servers is hacked and the decryption key thereof is leaked, the encrypted biometric information cannot be decrypted without the other decryption keys. Therefore, according to the exemplary embodiments of FIG. 4, security of the authentication system can be further improved.

Figure 5:
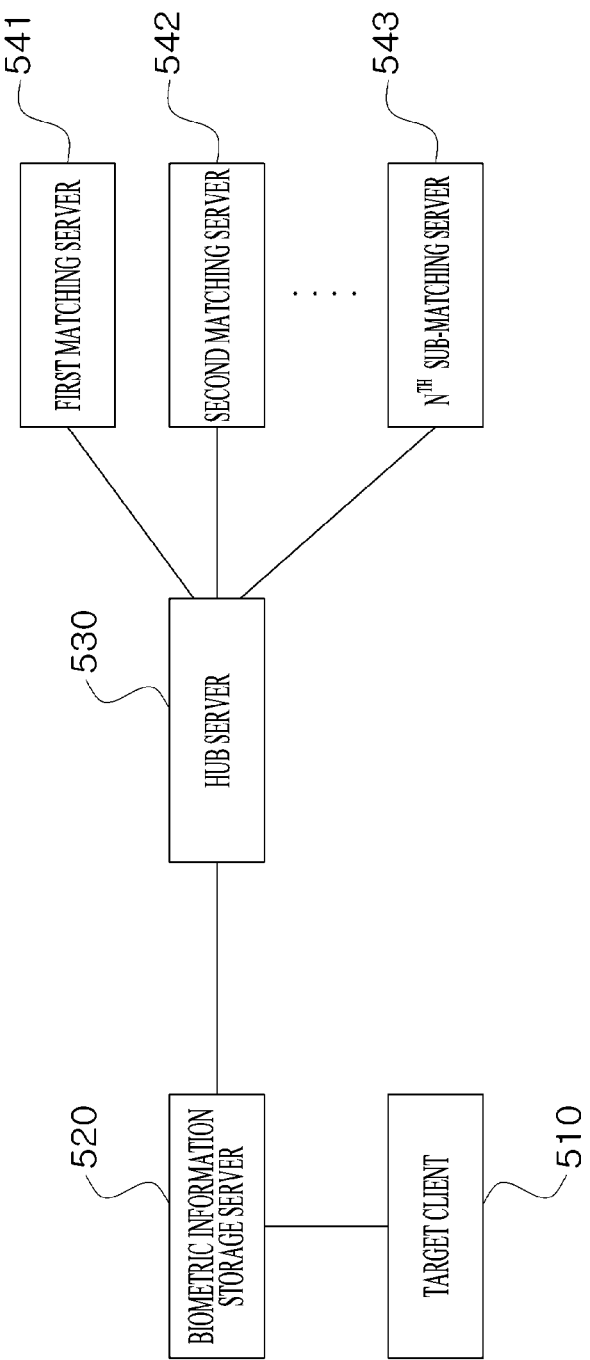
FIG. 5 is a diagram illustrating a hub server according to an exemplary embodiment.

FIG. 5 is a diagram illustrating a hub server according to an exemplary embodiment.

Referring to FIG. 5, an authentication system may include a target client 510, a biometric information storage server 520, a hub server 530, and a plurality of matching servers 541, 542, and 543. Although not shown in FIG. 5, each of the matching servers 541, 542, and 543 of FIG. 5 may communicate with at least one sub-matching server (e.g., the plurality of sub-matching servers 441, 442, and 443 of FIG. 4) like in FIG. 4. In other words, the exemplary embodiment of FIG. 5 differs from the exemplary embodiments of FIG. 4 in that there are a plurality of matching servers and the hub server 530 is added. The descriptions of the target client 410, the biometric information storage server 420, and the matching server 430 may be applied to the target client 510, the biometric information storage server 520, and the matching servers 541, 542, and 543 as they are.

In some exemplary embodiments of the present invention, the registration operation and the authentication operation may be performed in the authentication system.

The target client 510 may designate a server for storing a decryption key and provide information on the designation to the hub server 530 during the registration operation. For example, the target client 510 may designate a first matching server 541 among the plurality of matching servers 541, 542, and 543 as the server for storing a decryption key, and the hub server 530 may acquire information indicating that the target client 510 has designated the first matching server 541 as the server for storing a decryption key.

Also, the hub server 530 may acquire a decryption key from the target client 510 and provide the acquired decryption key to a matching server designated as the server for storing a decryption key by the target client 510 (the first matching server 541 in the above example) during the registration operation. It should be self-evident that, when a plurality of decryption keys from the hub server 530 are acquired, the matching server may provide the decryption keys to pre-designated sub-matching servers on a one-to-one basis.

The hub server 530 may acquire an identifier of the target client 510 from the biometric information storage server 520 or the target client 510 and designate a matching server for performing decryption among the plurality of matching servers 541, 542, and 543 using the identifier of the target client 510 during the authentication operation. Accordingly, the hub server 530 may transfer encrypted biometric information for registration, encrypted biometric information for authentication, and the identifier of the target client 510 to the designated matching server.

Also, the hub server 530 may request that the designated matching server match between the biometric information for registration and the biometric information for authentication, acquire the matching result from the designated matching server, and transfer the matching result to the biometric information storage server 520 or the target client 510.

Figure 6:
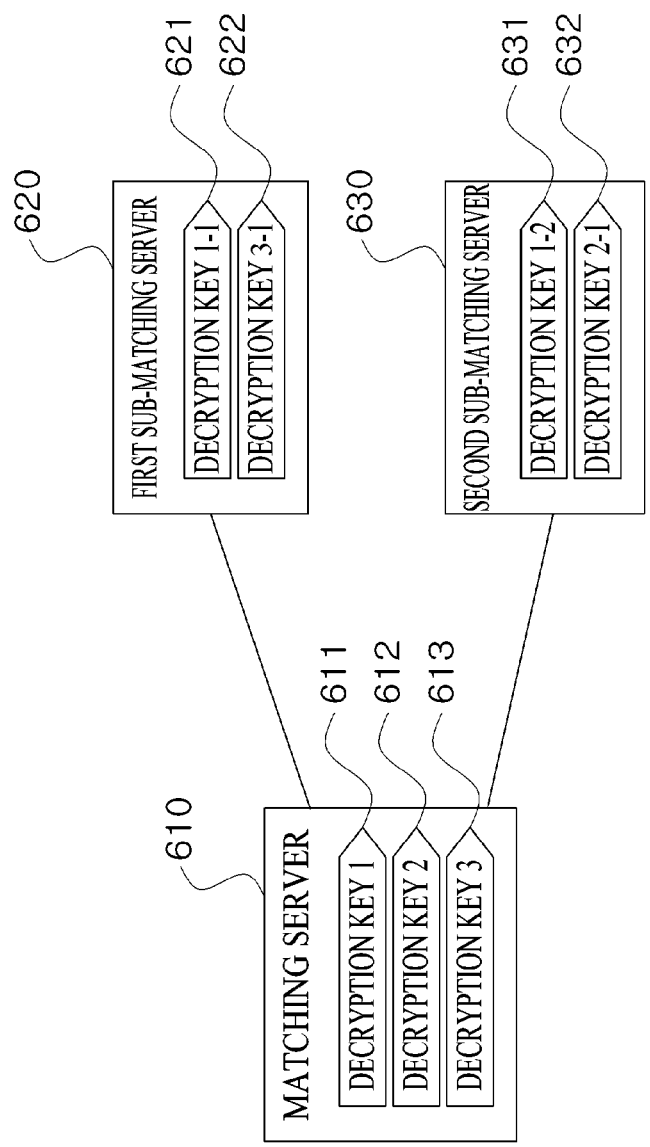
FIG. 6 is a diagram illustrating a decryption method according to an exemplary embodiment when there are sub-matching servers.

FIG. 6 is a diagram illustrating a decryption method according to an exemplary embodiment when there are sub-matching servers.

Referring to FIG. 6, a first sub-matching server 620 and a second sub-matching server 630 are subordinate to a matching server 610 and decrypt encrypted biometric information under control of the matching server 610.

In an exemplary embodiment, the matching server 610 includes decryption keys 1, 2, and 3 (611, 612, and 613) for decrypting pieces of biometric information which have been separately encrypted by first, second, and third clients. The first sub-matching server 620 is intended to decrypt encrypted biometric information corresponding to decryption key 1 (611), that is, generated by the first client, but includes decryption key 1-1 (621), which is separate from decryption key 1 (611), and decryption key 3-1 (622) corresponding to decryption key 3 (613). Also, the second sub-matching server 630 includes decryption key 1-2 (631) corresponding to decryption key 1 (611) and decryption key 2-1 (632) corresponding to decryption key 2 (612).

Specifically, the matching server 610 may acquire an identifier of the first client from a biometric information storage server. In this case, the matching server 610 may extract decryption key 1 (611) among the decryption keys 611, 612, and 613 as a decryption key that will be used for decryption using the identifier of the first client. Also, the matching server 610 may transmit the identifier of the first client to the first sub-matching server 620 and the second sub-matching server 630. In this case, the first sub-matching server 620 may select decryption key 1-1 (621) as the decryption key that will be used for decryption using the identifier of the first client, and the second sub-matching server 630 may select decryption key 1-2 (631) as the decryption key that will be used for decryption using the identifier of the first client. Accordingly, the biometric information encrypted by the first client is decrypted by the matching server 610, the first sub-matching server 620, and the second sub-matching server 630.

In another example, the matching server 610 may acquire an identifier of the second client from the biometric information storage server. In this case, the matching server 610 may extract decryption key 2 (612) among the decryption keys 611, 612, and 613 as a decryption key that will be used for decryption using the identifier of the second client. Also, the matching server 610 may transmit the identifier of the second client to the first sub-matching server 620 and the second sub-matching server 630. In this case, the first sub-matching server 620 does not include a decryption key corresponding to the identifier of the second client and thus does not extract any decryption key, and the second sub-matching server 630 may select decryption key 2-1 (632) as the decryption key that will be used for decryption using the identifier of the second client. Accordingly, the biometric information encrypted by the second client is decrypted by the matching server 610 and the second sub-matching server 630 and is not decrypted by the first sub-matching server 620.

Figure 7:
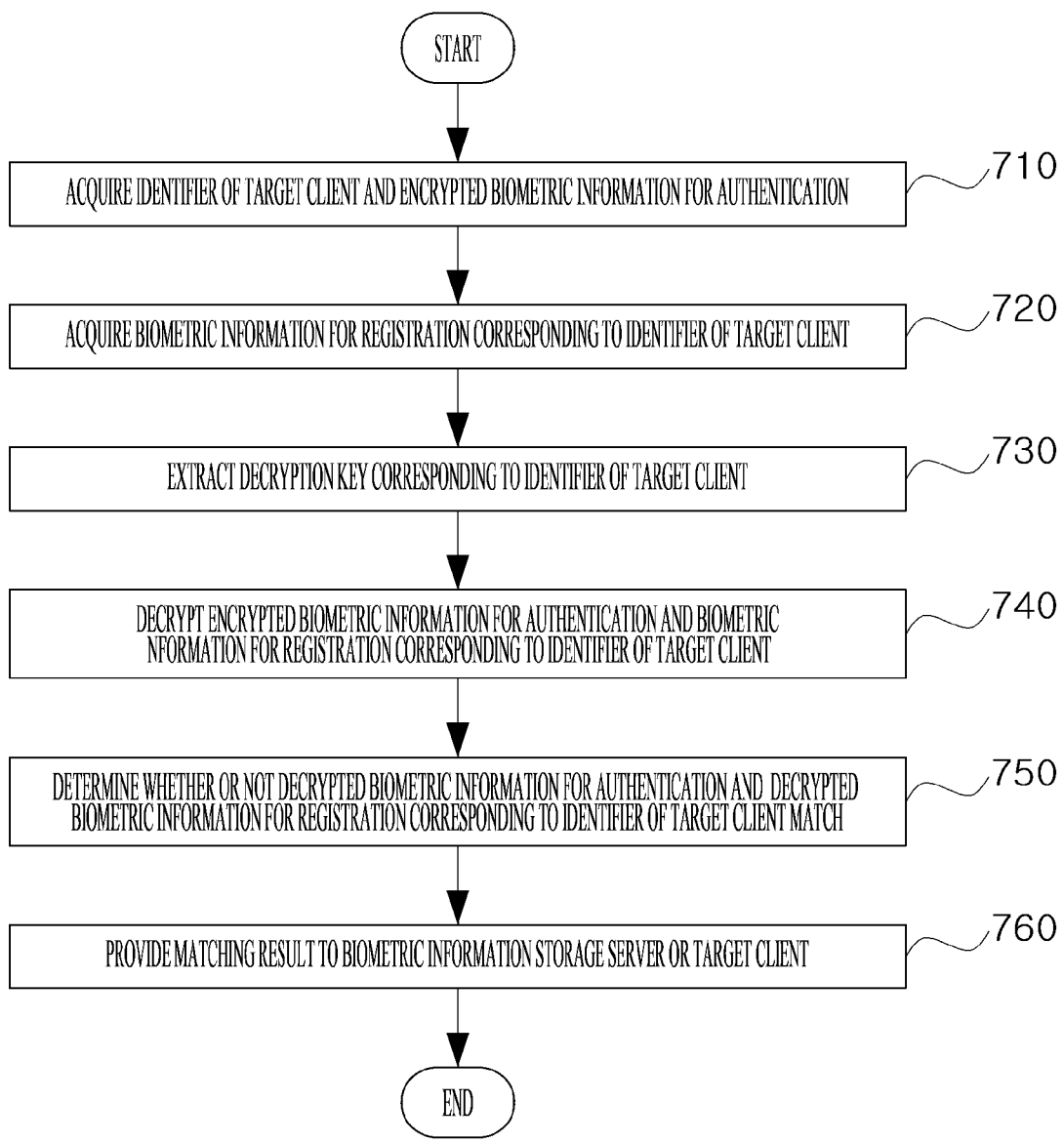
FIG. 7 is an operational flowchart showing a control method of a decryption key storage server according to an exemplary embodiment.

FIG. 7 is an operational flowchart showing a control method of a decryption key storage server according to an exemplary embodiment.

Referring to FIG. 7, an authentication system includes a biometric information storage server, a target client, and a decryption key storage server. Specifically, the biometric information storage server may store biometric information for registration acquired from each of at least one client, the target client may be included in the at least one client, acquire biometric information for authentication of a user, and encrypt the biometric information for authentication using a unique encryption key, and the decryption key storage server may store at least one decryption key. In other words, the at least one decryption key is stored in the decryption key storage server that is separate from the biometric information storage server storing the biometric information for registration so that security of the authentication system is improved.

In the control method of a decryption key storage server, the decryption key storage server may acquire an identifier of the target client and encrypted biometric information for authentication (710).

The decryption key storage server may acquire biometric information for registration corresponding to the identifier to be matched among pieces of biometric information for registration (720). Here, the biometric information for registration may have been encrypted by clients that transmit the biometric information for registration.

The decryption key storage server may extract a decryption key corresponding to the identifier from at least one decryption key (730).

The decryption key storage server may decrypt the encrypted biometric information for authentication and biometric information for registration corresponding to the identifier using the decryption key corresponding to the identifier (740).

The decryption key storage server may determine whether or not the decrypted biometric information for authentication and the biometric information for registration corresponding to the identifier match (750).

The decryption key storage server may provide the matching result to the biometric information storage server or the target client (760).

Since the descriptions of FIGS. 1 to 6 may be applied to the control method of a decryption key storage server illustrated in FIG. 7 as they are, a more detailed description thereof will be omitted.

Figure 8:
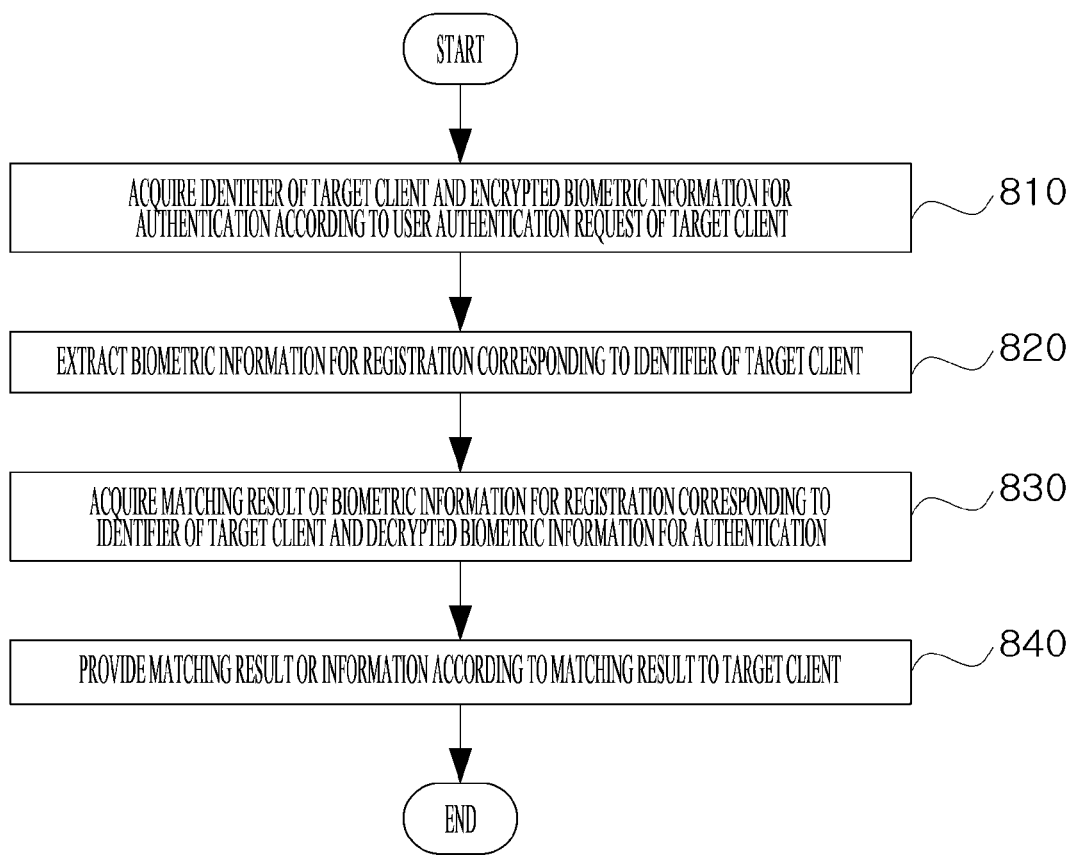
FIG. 8 is an operational flowchart showing a control method of a biometric information storage server according to an exemplary embodiment.

FIG. 8 is an operational flowchart showing a control method of a biometric information storage server according to an exemplary embodiment.

Referring to FIG. 8, an authentication system includes a biometric information storage server, a target client, and a decryption key storage server. Specifically, the biometric information storage server may store biometric information for registration acquired from each of at least one client, the target client may be included in the at least one client, acquire biometric information for authentication of a user, and encrypt the biometric information for authentication using a unique encryption key, and the decryption key storage server may store at least one decryption key. In other words, the biometric information for registration is stored in the biometric information storage server that is separate from the decryption key storage server storing the at least one decryption key so that security of the authentication system is improved.

In the control method of a biometric information storage server, the biometric information storage server may acquire an identifier of the target client and encrypted biometric information for authentication according to a user authentication request of the target client (810).

The biometric information storage server may extract biometric information for registration corresponding to the identifier of the target client among pieces of biometric information for registration (820). In this case, the biometric information for registration may have been encrypted by clients that transmit the biometric information for registration.

The biometric information storage server may acquire a matching result of the biometric information for registration corresponding to the identifier and decrypted biometric information for authentication (830).

The biometric information storage server may provide the matching result or information according to the matching result to the target client (840).

Since the descriptions of FIGS. 1 to 6 may be applied to the control method of a biometric information storage server illustrated in FIG. 8 as they are, a more detailed thereof description will be omitted.

Figure 9:
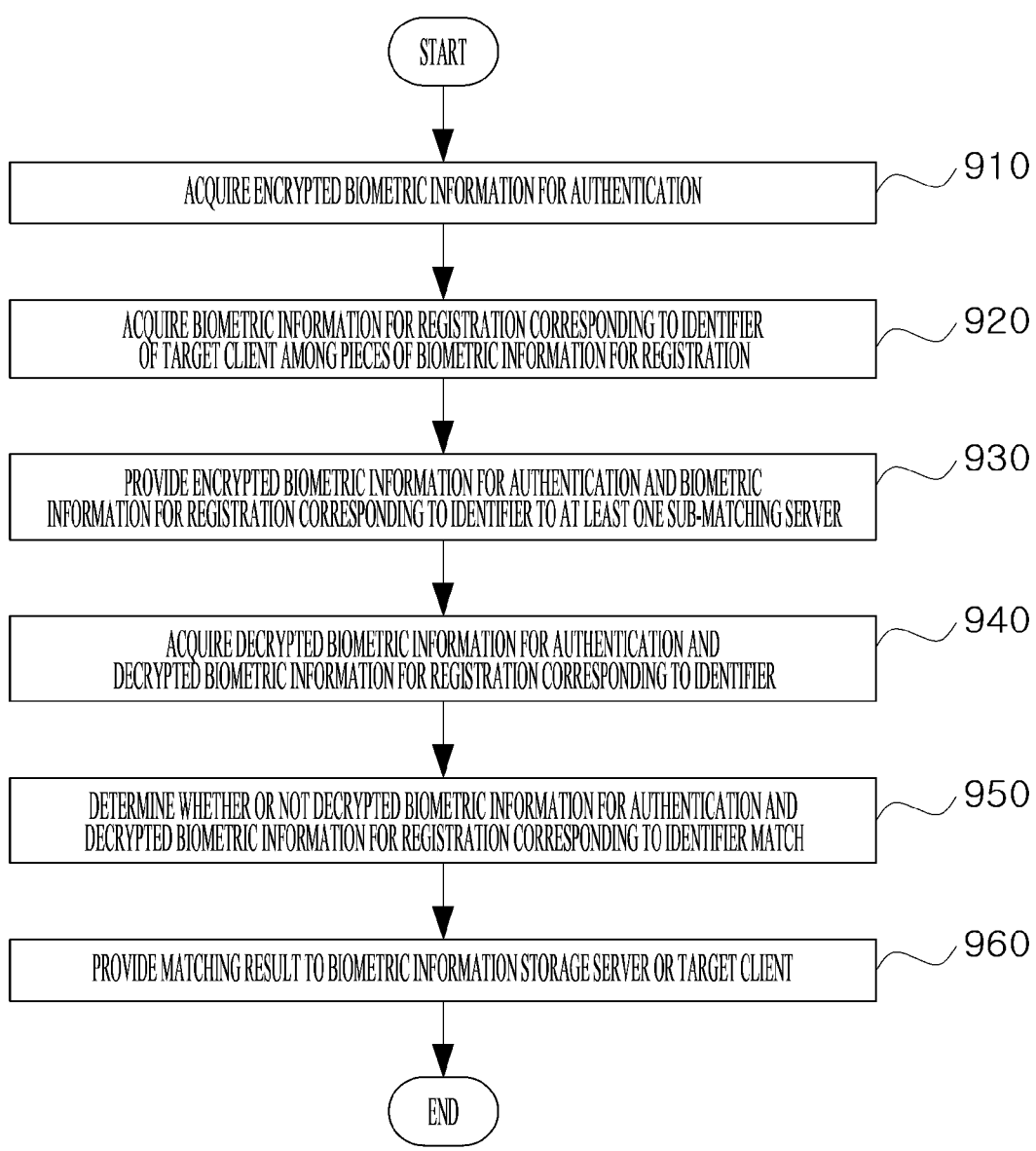
FIG. 9 is an operational flowchart showing a control method of a matching server according to an exemplary embodiment.

FIG. 9 is an operational flowchart showing a control method of a matching server according to an exemplary embodiment.

Referring to FIG. 9, an authentication system includes a biometric information storage server, a target client, at least one sub-matching server, and a matching server. Specifically, the biometric information storage server may store biometric information for registration acquired from each of at least one client, the target client may be included in the at least one client, acquire biometric information for authentication of a user, and encrypt the biometric information for authentication using a unique encryption key, the at least one sub-matching server may decrypt the biometric information for authentication using a decryption key, and the matching server may match a piece of the biometric information for registration to the biometric information for authentication. In other words, the decryption key is stored in the matching server or at least one of the at least one sub-matching server that is separate from the biometric information storage server so that security of the authentication system is improved.

In the control method of a matching server, the matching server may acquire encrypted biometric information for authentication (910).

The matching server may acquire biometric information for registration corresponding to an identifier of the target client among pieces of biometric information for registration (920). In this case, the biometric information for registration may have been encrypted by clients that transmit the biometric information for registration.

To decrypt the encrypted biometric information for authentication and the biometric information for registration corresponding to the identifier, the matching server may provide the encrypted biometric information for authentication and the biometric information for registration corresponding to the identifier to at least one sub-matching server (930).

The matching server may acquire decrypted biometric information for authentication and decrypted biometric information for registration corresponding to the identifier (940).

The matching server may determine whether or not the decrypted biometric information for authentication and the decrypted biometric information for registration corresponding to the identifier match (950).

The matching server may provide the matching result to the biometric information storage server or the target client (960).

Since the descriptions of FIGS. 1 to 6 may be applied to the control method of a matching server illustrated in FIG. 9 as they are, a more detailed description thereof will be omitted.

The methods according to exemplary embodiments may be implemented in the form of program instructions, which are executable by various computer means, and stored in a computer-readable recording medium. The computer-readable recording medium may include program instructions, data files, and data structures solely or in combination. The program instructions stored in the computer-readable recording medium may be specially designed and constructed for the exemplary embodiments, or may be well-known to those or ordinary skill in the computer software field. Examples of the computer-readable recording medium may include magnetic media, such as a hard disk, a floppy disk, and a magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, specifically constructed to store and execute program instructions. Examples of the program instructions include high-level language code executable by a computer using an interpreter or the like as well as machine language code made by a compiler. The hardware devices may be configured to operate as one or more software modules or vice versa to perform operations of the exemplary embodiments.

According to exemplary embodiments of the present invention, a user can safely store his or her biometric information in a network.

According to exemplary embodiments of the present invention, biometric information of a user is encrypted and decrypted in a network so as not to be leaked.

According to exemplary embodiments of the present invention, biometric information is used more safely and conveniently to authenticate a user.

Although the present invention has been described with reference to limited embodiments and the accompanying drawings, those of ordinary skill in the art can implement various modifications and variations from the above description. For example, an appropriate result may be achieved even when the described techniques are performed in a different order than the described method, and/or components of the described system, structure, circuit, etc. are coupled or combined in different forms than the described method or replaced with other components or equivalents.

Therefore, other implementations, other embodiments, and equivalents of the claims also fall within the scope of the claims.

What is claimed is:

1. A control method of a decryption key storage server in an authentication system including a biometric information storage server, a target client included in the at least one client, and the decryption key storage server, the control method comprising:

acquiring an identifier of the target client and the encrypted biometric information for authentication encrypted based on a biometric information for authentication of a user and a unique encryption key by the target client, wherein the biometric information for authentication is acquired by the target client;

acquiring biometric information for registration corresponding to the identifier among at least one biometric information for registration stored in the biometric information storage server, wherein the biometric information for registration is encrypted by the target client;

each of the at least one client providing the biometric information for registration to the biometric information storage server;

extracting a decryption key corresponding to the identifier from the at least one decryption key in the decryption storage server;

decrypting the encrypted biometric information for authentication and the biometric information for registration corresponding to the identifier using the decryption key corresponding to the identifier;

determining whether or not the decrypted biometric information for authentication and the decrypted biometric information for registration corresponding to the identifier match; and providing a matching result to the biometric information storage server or the target client, wherein the at least one decryption key is stored in the decryption key storage server separated from the at least one client and the biometric information storage server, wherein the biometric information for registration is stored in the biometric information storage server separated from the at least one client and the decryption key storage server where the at least one decryption key is stored, wherein the decryption key storage server decrypt the encrypted biometric information for registration when the encrypted biometric information for registration is transmitted to the decryption key storage server by the biometric information storage server, wherein the biometric information for authentication is acquired and encrypted in the target client of the at least one client separated from the biometric information storage server and the decryption key storage server, and wherein the decryption key, which is corresponding to the unique encryption key of the at least one client, respectively, is transmitted by the at least one client to the decryption key storage server without passing through the biometric information storage server, and wherein the biometric information for registration, which is encrypted through the unique encryption key, is transmitted by the at least one client to the biometric information storage server without passing through the decryption key storage server, and wherein the decryption key and the biometric information for registration are not stored in the decryption key storage server or the biometric information storage server together.

2. The control method of claim 1, wherein the acquiring of the identifier of the target client and the encrypted biometric information for authentication comprises receiving the identifier of the target client and the encrypted biometric information for authentication from the biometric information storage server when the identifier of the target client and the encrypted biometric information for authentication are received in the biometric information storage server according to a user authentication request of the target client.

3. The control method of claim 1, wherein the acquiring of the identifier of the target client and the encrypted biometric information for authentication comprises acquiring the identifier of the target client and the encrypted biometric information for authentication from the target client according to a user authentication request of the target client.

4. The control method of claim 1, wherein an attribute for distinguishing the biometric information for authentication from the biometric information for registration is assigned to the biometric information for authentication by the target client.

5. The control method of claim 4, wherein the attribute includes a validity period, a registration validity period is assigned to the biometric information for registration, an authentication validity period is assigned to the biometric information for authentication, and the control method further comprises deleting the biometric information for authentication when the authentication validity period has expired.

6. The control method of claim 1, wherein the biometric information includes fingerprint information, and the determining of whether or not the decrypted biometric information for authentication and the decrypted biometric information for registration corresponding to the identifier match comprises:

extracting feature points of the decrypted biometric information for registration corresponding to the identifier;

extracting feature points of the decrypted biometric information for authentication; and extracting a similarity between the decrypted biometric information for registration corresponding to the identifier and the decrypted biometric information for authentication and determining that the decrypted biometric information for registration corresponding to the identifier and the decrypted biometric information for authentication match when the similarity is greater than or equal to a predetermined reference value.

7. A control method of a biometric information storage server in an authentication system including the biometric information storage server a target client included in the at least one client, a decryption key storage server, the control method comprising:

acquiring an identifier of the target client and the encrypted biometric information for authentication encrypted based on a biometric information for authentication of a user and a unique encryption key by the target client according to a user authentication request of the target client, wherein the biometric information for authentication is acquired by the target client;

extracting biometric information for registration corresponding to the identifier of the target client among pieces of the biometric information for registration having been encrypted by each of the at least one client transmitting the biometric information for registration;

acquiring a matching result of the biometric information for registration corresponding to the identifier and the biometric information for authentication decrypted based on at least a portion of the at least one decryption key stored in the decryption key storage server; and providing the matching result or information according to the matching result to the target client, wherein the at least one decryption key is stored in the decryption key storage server separated from the at least one client and the biometric information storage server and the decryption key is not stored with the at least one biometric information for registration in the biometric information server, wherein the biometric information for registration is stored in the biometric information storage server separated from the at least one client and the decryption key storage server where the at least one decryption key is stored, wherein the decryption key storage server decrypt the encrypted biometric information for registration when the encrypted biometric information for registration is transmitted to the decryption key storage server by the biometric information storage server, wherein the biometric information for authentication is acquired and encrypted in the target client of the at least one client separated from the biometric information storage server and the decryption key storage server;

wherein the decryption key, which is corresponding to the unique encryption key of the at least one client, respectively, is transmitted by the at least one client to the decryption key storage server without passing through the biometric information storage server, and wherein the biometric information for registration, which is encrypted through the unique encryption key, is transmitted by the at least one client to the biometric information storage server without passing through the decryption key storage server, and wherein the decryption key and the biometric information for registration are not stored in the decryption key storage server or the biometric information storage server together.

8. The control method of claim 7, wherein the acquiring of the matching result comprises:

providing the identifier, the encrypted biometric information for authentication, and the biometric information for registration corresponding to the identifier to the decryption key storage server; and acquiring the matching result from the decryption key storage server.

9. The control method of claim 7, wherein the acquiring of the matching result comprises:

acquiring a decryption key corresponding to the identifier among the at least one decryption key from the decryption key storage server;

decrypting the encrypted biometric information for authentication and the biometric information for registration corresponding to the identifier using the decryption key corresponding to the identifier; and determining whether or not the decrypted biometric information for authentication and the biometric information for registration corresponding to the identifier match.

10. A control method of a matching server in an authentication system including a biometric information storage server at least one sub-matching server, and the matching server, the control method comprising:
acquiring the encrypted biometric information for authentication, wherein the biometric information for authentication is acquired by the target client and encrypted based on a biometric information for authentication of a user and a unique encryption key by the target client;
each of the at least one client providing the biometric information for registration to the biometric information storage server;
acquiring biometric information for registration corresponding to an identifier of the target client among pieces of the biometric information for registration having been encrypted by each of the at least one client transmitting the biometric information for registration;
providing the encrypted biometric information for authentication and the biometric information for registration corresponding to the identifier to the at least one sub-matching server to decrypt the encrypted biometric information for authentication and the biometric information for registration corresponding to the identifier, wherein the at least one sub-matching server decrypt the biometric information for authentication and the biometric information for registration using a decryption key;
acquiring the decrypted biometric information for authentication and the decrypted biometric information for registration corresponding to the identifier;
determining whether or not the decrypted biometric information for authentication and the decrypted biometric information for registration corresponding to the identifier match, wherein the matching server matches a piece of the biometric information for registration to the biometric information for authentication; and
providing a matching result to the biometric information storage server or the target client,
wherein the at least one decryption key is stored in the at least one sub-matching server or the matching server separated from the at least one client and the biometric information storage server and the decryption key is not stored with the at least one biometric information for registration in the biometric information server,
wherein the biometric information for registration is stored in the biometric information storage server separated from the at least one client and the at least one sub-matching server or the matching server where the at least one decryption key is stored and the at least one of sub-matching server or the matching server decrypt the encrypted biometric information for registration when the encrypted biometric information for registration is transmitted to the at least one of sub-matching server or the matching server by the biometric information storage server, and
wherein the biometric information for authentication is acquired and encrypted in the target client of the at least one client separated from the biometric information storage server and the at least one sub-matching server or the matching server,
wherein the decryption key, which is corresponding to the unique encryption key of the at least one client, respectively, is transmitted by the at least one client to the matching server or the sub-matching server without passing through the biometric information storage server, and wherein the biometric information for registration, which is encrypted through the unique encryption key, is transmitted by the at least one client to the biometric information storage server without passing through the matching server or the sub-matching server, and
wherein the decryption key and the biometric information for registration are not stored in the matching server, the sub-matching server or the biometric information storage server together.

11. The control method of claim 10, wherein the encrypted biometric information for authentication and the biometric information for registration corresponding to the identifier are consecutively decrypted by the at least one sub-matching server in a predetermined order.

12. The control method of claim 10, further comprising dividing the encrypted biometric information for authentication and the biometric information for registration corresponding to the identifier into a predetermined number of pieces,
wherein the divided pieces of encrypted biometric information for authentication and the divided pieces of biometric information for registration corresponding to the identifier are decrypted by the at least one sub-matching server.

13. The control method of claim 10, further comprising, when the matching server includes at least one decryption key:
acquiring the identifier of the target client;
extracting a decryption key corresponding to the identifier of the target client from the at least one decryption key; and
partially decrypting the encrypted biometric information for authentication and the biometric information for registration corresponding to the identifier of the target client using the decryption key corresponding to the identifier.

14. The control method of claim 10, wherein the decryption key used by the at least one sub-matching server to decrypt the encrypted biometric information for authentication and the biometric information for registration corresponding to the identifier is extracted from a plurality of decryption keys separately stored in the at least one sub-matching server based on the identifier of the target client.

15. The control method of claim 10, wherein, when the authentication system includes a plurality of sub-matching servers including the at least one sub-matching server, the at least one sub-matching server is determined among the plurality of sub-matching servers by the target client or the identifier.

16. The control method of claim 10, wherein, when the authentication system includes a plurality of matching servers including the matching server, the matching server is determined among the plurality of matching servers by a hub server.

17. A non-transitory computer-readable recording medium in which a program for carrying out a control method, the control method comprising:
acquiring an identifier of the target client and the encrypted biometric information for authentication encrypted based on a biometric information for authentication of a user and a unique encryption key by the target client, wherein the biometric information for authentication is acquired by the target client;

acquiring biometric information for registration corresponding to the identifier among at least one biometric information for registration stored in the biometric information storage server, wherein the biometric information for registration is encrypted by the target client, each of the at least one client providing the biometric information for registration to the biometric information storage server;

extracting a decryption key corresponding to the identifier from the at least one decryption key in the decryption storage server;

decrypting the encrypted biometric information for authentication and the biometric information for registration corresponding to the identifier using the decryption key corresponding to the identifier;

determining whether or not the decrypted biometric information for authentication and the decrypted biometric information for registration corresponding to the identifier match; and providing a matching result to the biometric information storage server or the target client, wherein the at least one decryption key is stored in the decryption key storage server separated from the at least one client and the biometric information storage server, and the decryption key is not stored with the at least one biometric information for registration in the biometric information server, wherein the biometric information for registration is stored in the biometric information storage server separated from the at least one client and the decryption key storage server where the at least one decryption key is stored and the decryption key storage server decrypt the encrypted biometric information for registration when the encrypted biometric information for registration is transmitted to the decryption key storage server by the biometric information storage server, wherein the biometric information for authentication is acquired and encrypted in the target client of the at least one client separated from the biometric information storage server and the decryption key storage server, wherein the decryption key, which is corresponding to the unique encryption key of the at least one client, respectively, is transmitted by the at least one client to the decryption key storage server without passing through the biometric information storage server, and wherein the biometric information for registration, which is encrypted through the unique encryption key, is transmitted by the at least one client to the biometric information storage server without passing through the decryption key storage server, and wherein the decryption key and the biometric information for registration are not stored in the decryption key storage server or the biometric information storage server together.

* * * * *